Figure 1:
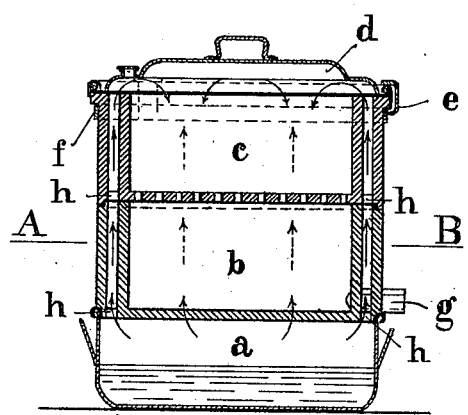

H. A. KELLER.
APPARATUS FOR USE IN EXTRACTING FRUIT JUICES AND COMPRISING VESSELS FOR RECEIVING THE FRUIT AND THE JUICE.
APPLICATION FILED MAR. 24, 1914.

1,130,519.

Patented Mar. 2, 1915.

UNITED STATES PATENT OFFICE.

HERMANN ADOLF KELLER, OF FRANKFORT-ON-THE-MAIN, GERMANY.

APPARATUS FOR USE IN EXTRACTING FRUIT-JUICES AND COMPRISING VESSELS FOR RECEIVING THE FRUIT AND THE JUICE.

1,130,519.  Specification of Letters Patent.  Patented Mar. 2, 1915.

Application filed March 24, 1914. Serial No. 826,984.

*To all whom it may concern:*

Be it known that I, HERMANN ADOLF KELLER, a subject of the Emperor of Germany, and a resident of Frankfort-on-the-Main, Germany, have invented certain new and useful Improvements in Apparatus for Use in Extracting Fruit-Juices and Comprising Vessels for Receiving the Fruit and the Juice, of which the following is a specification.

This invention relates to an apparatus for use in extracting fruit juices, and comprising vessels for receiving the fruit and the juice, which vessels are adapted to be placed on a suitable steam generating vessel and closed in a steam-tight manner by a cover. The device for pressing the cover into position is removable, and the vessels for the reception of the fruit and juice are surrounded by a jacket or annular space for the passage of steam, from the steam generating vessel to the top of the fruit.

Figure 2:
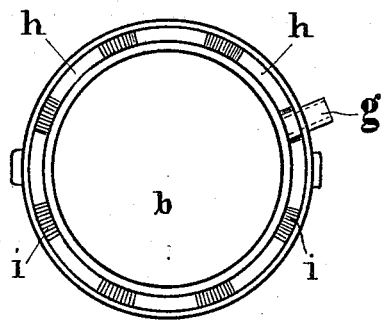

In the drawing is illustrated an example of construction according to this invention:

Figure 1 is a vertical section of the apparatus, and Fig. 2 is a section on the line A—B of Fig. 1.

The apparatus comprises a steam generating vessel $a$, the vessel $b$ for the reception of the fruit juice and the vessel $c$ for the fruit. These vessels are superposed, and in order that they may be securely supported one on another while providing adequate steam-tight joints, they are formed so that they fit one into another. The hood-shaped cover $d$ forms a steam-tight closure of the vessel $c$ for the fruit, and it is retained in position by levers $e$ hinged to a ring $f$ removably placed around the jacket of the vessel $c$. The bottom of the vessel $c$ is perforated in the known manner in order to permit of the percolation of the juice, and the vessel $b$ receiving the juice is provided in the known manner with a lateral outlet $g$.

The characteristic feature of the invention is the device for conducting the steam generated in the steam generator $a$ from the latter, past the fruit and juice vessels to the space between the cover and the vessel $c$. For this purpose the vessels $b$ and $c$ for the fruit and juice are made double walled, and the annular space formed between these walls constitutes a steam conducting jacket. The bottoms of the vessels $b$ and $c$ within the double walls are perforated or provided with apertures $h$ for the passage of the steam. The stays $i$ thus formed, as seen in Fig. 2, serve to connect the vessels to their outer walls. The stays $i$ may be extended vertically through the annular space between the double walls of the vessels but so as to leave steam passages at the top and bottom. In this manner the annular space would be divided into a number of vertical passages through which the steam would pass to the top of the vessel $c$ for the fruit. The steam passes around the vessels for the fruit and juice and afterward acts effectively upon the fruit from the top. The loose superposed system of mounting possesses the required stability by reason of the weight of the superposed vessels which fit one into another.

Having thus described my invention, what I claim as new and desire to secure by Letters Patent is:—

A vessel for extracting fruit juices, comprising double walled vessels for the fruit and juice, the vessels being superposed and fitting one into the other, the vessel for the fruit having a perforated bottom, a cover on the vessel for the fruit, a removable ring on said vessel, hinged locking members on said ring, said locking members being adapted to lock the lid in position, and a steam generator, the space between the double walls providing communication from the steam generator to the cover.

In testimony whereof I affix my signature in presence of two witnesses.

HERMANN ADOLF KELLER.

Witnesses:
 JEAN GRUND,
 CARL GRUND.

Copies of this patent may be obtained for five cents each, by addressing the "Commissioner of Patents, Washington, D. C."